Aug. 30, 1932.　　　R. C. HUNTSBERGER　　　1,874,296
GAUGE MECHANISM
Filed March 8, 1930　　5 Sheets-Sheet 3

INVENTOR.
Russell C. Huntsberger
BY Allen + Allen
ATTORNEYS

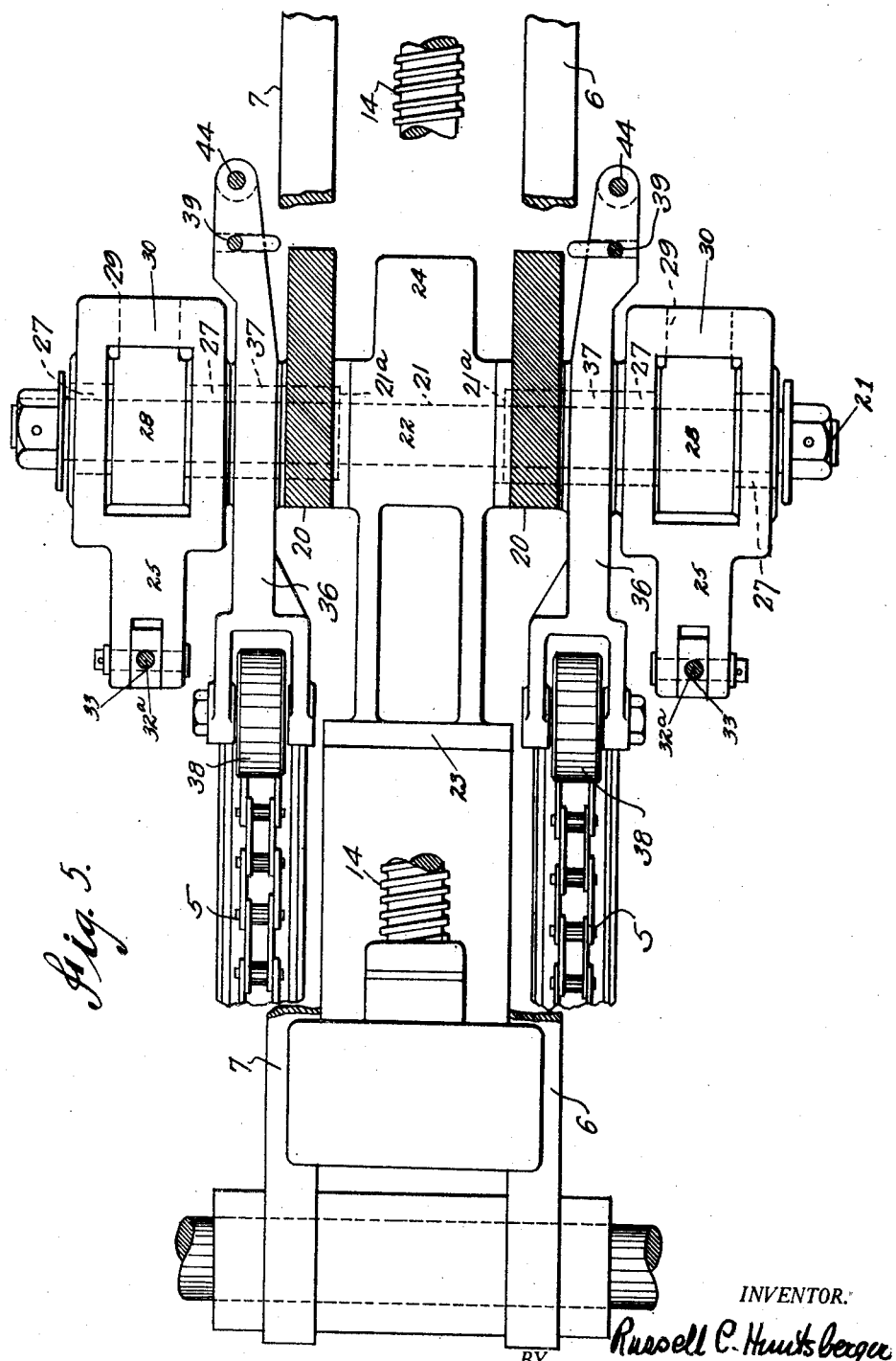

Patented Aug. 30, 1932

1,874,296

UNITED STATES PATENT OFFICE

RUSSELL C. HUNTSBERGER, OF ASHLAND, KENTUCKY, ASSIGNOR TO THE AMERICAN ROLLING MILL COMPANY, OF MIDDLETOWN, OHIO, A CORPORATION OF OHIO

GAUGE MECHANISM

Application filed March 8, 1930. Serial No. 434,333.

My invention is directed to the provision of an improved gauging mechanism, which may be automatic in operation, such as is adaptable for use on cut off shears and the like, where a metal piece, by way of example, is fed between the shear knives for a predetermined distance, controlled by gauge, and is then cut off. I shall describe my invention in an embodiment suitable for use in such a shear, it being understood that its application is not restricted to shears alone but is adaptable to mechanisms performing an operation upon a length of material at a predetermined distance from one end thereof.

The broad objects of my invention are to provide a gauge of improved construction and operation, together with improvements in actuating devices therefor.

These and other objects of my invention do not need further elaboration but will be clear to one skilled in the art upon reading these specifications and considering the drawings which form a part thereof.

In the drawings:

Figure 5 is a view partly in plan and partly in section to show more clearly certain of the operating parts of my gauge.

Figure 1:
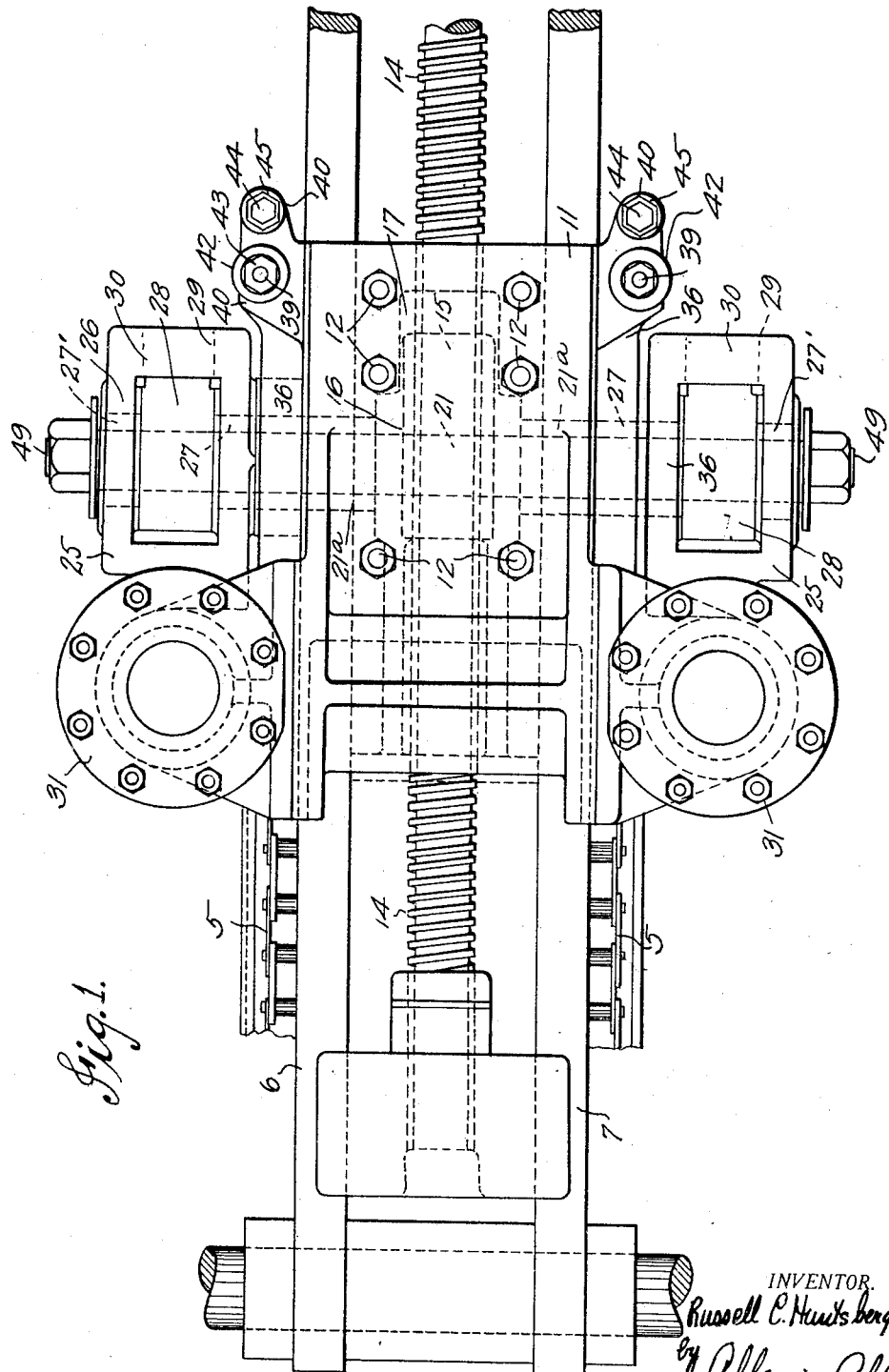
Figure 1 is a plan view of my gauge from above.
Figure 2:
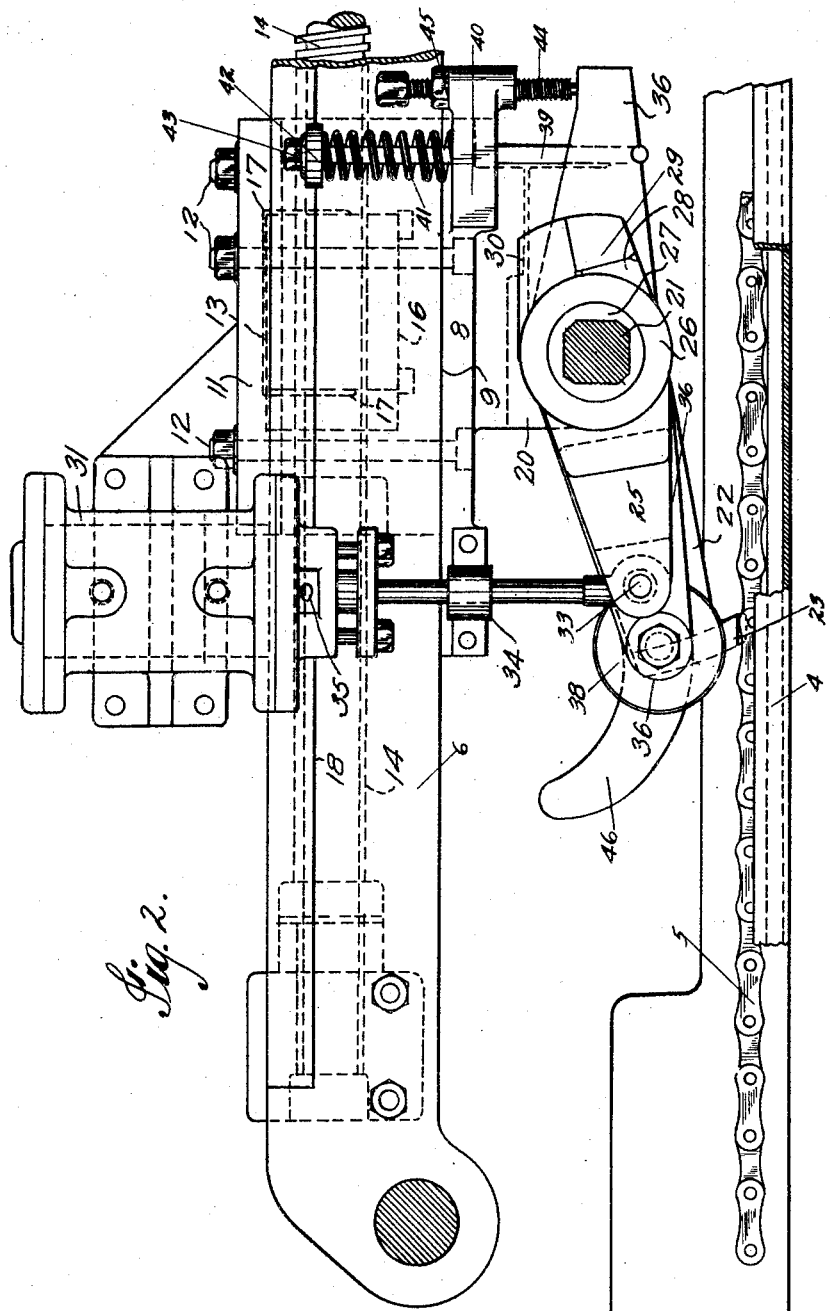
Figure 2 is a side elevation.
Figure 3:
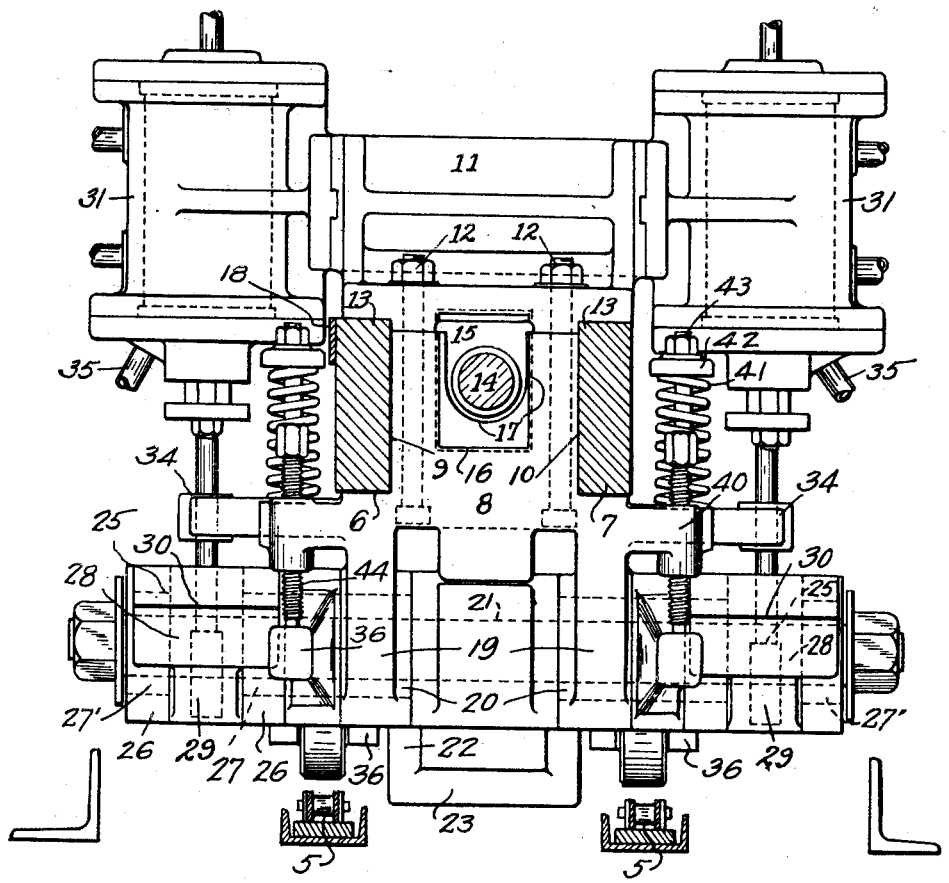
Figure 3 is an end elevation.

In describing an embodiment of my gauge mechanism suitable for use with cut off shears for hot or cold metal, I have shown in Figure 2 a pair of feed rolls 1 which feed metal pieces between the knives 2 and 3 of a shear which is not shown in detail. The piece, after passing through the knives, is fed along a shear table comprising the well known supporting frame work 4 and a conveying mechanism 5 which, in the instance shown, is a chain conveyor. A combination gauge and stop determines the distance which the piece will be fed along the table and arrests its motion when the required distance has been reached. Then the movable knife 3 of the shear descends and effects a cut, whereupon the stop member of the gauge is removed and the piece further fed along the table to some delivery point.

In such shears, a pair of rails 6 and 7 have been located above the table, where the gauging mechanism is to be adjustable to different lengths, and gauge and stop means have been movably located upon these rails. The rails themselves are old and the manner of their mounting above the shear table is not a part of my present invention.

Broadly in my invention I provide gauge and stop mechanism with a body riding along and supported by these rails, the body supporting suitable movable stop means, suitable guiding or hold down means, and suitable operating means whereby the stop is lifted out of the way at the end of the operation upon the material, so that the conveyor may carry the material away. Means are also provided to move the gauge and stop along the rails so that it may be set at any desired point for making a cut of a desired length. The body of the gauge is shown in the several views as comprising a lower part 8 having ways 9 and 10 within which the rails are received, and an upper part 11 held thereto by bolts 12. This upper part has portions 13 contacting the tops of the rails and it will be understood that the body of my gauge and stop mechanism may slide along these rails. Located between them is a threaded shaft 14 suitably journaled at either end of the rails for rotative but not longitudinal movement; and at one end of the rails the shaft 14 may be provided with a hand wheel or other means for turning it. The shaft passes through a nut 15 which is held in a socket 16 in the body portion 8, non-rotatably. Lips 17 about the socket serve to hold the nut in place and to confine the nut in the body of my gauge mechanism so that when the threaded shaft 14 is rotated, the gauge will be moved along the rails in either direction depending upon the direction of rotation. A suitable scale 18 may be attached to one of the rails if desired, and a suitable pointer placed upon the body of the gauge so that the length of cut may be visually determined in advance. My gauge and stop mechanism is such that it can be operated in exactly the same way whatever position it occupies along the rails, as will be readily understood.

A pair of depending extensions 19 form interspaced bearings 20 for a square shaft 21 held therein for rotation by bushings 21a, in a horizontal position transverse to and above the table and conveyor mechanism 5. Between the two extensions there is fixed to the shaft a stop mechanism 22 which is in the form of an arm fitting on the square shaft 21 and having a forwardly extending abutment portion 23 of a shape to arrest the travel of metal pieces along the conveyor 5 when in downwardly extending position. A rearwardly extension 24 of the stop may serve as a counter weight. It will be obvious that upon partial rotation of the shaft 21, the stop may be raised or lowered so as to come into or out of the path of travel of pieces along the conveyor. To control the movements of the shaft I provide arms 25 which are rotatably journalled upon the shaft. These arms are yoke shaped, and have bearing portions 26 which ride upon bushings 27 on the shaft. Thus the movement of these arms does not tend directly to move the shaft 21. Members 28 are fixed non-rotatably to the shaft within the yoke shaped portions of the arms 25 and have rearwardly extending pawls or abutment portions 29. These are contacted by the rear portion 30 of the yokes of arms 25 so that when these arms are rotated clockwise (in Figure 2) the shaft 21 will be rotated in such a way as to raise the abutment portion 23 of the stop out of the path of travel of metal pieces on the conveyor. The interaction of the yoke arms 25 and the pawl members 28 is such however that the arms 25 may be rotated counter clockwise without effecting a corresponding counter clockwise rotation of the shaft and stop means. It will thus be understood that when a metal piece has been stopped by the abutment 23 and a shear cut made, then the arms 25 may be rotated in a clockwise direction sufficiently to raise the stop means and let the piece pass on. As soon as the stop means has been raised however, the arms 25 may return to the position shown in Figure 2; but the stop means will not return to the position in which it is shown in that figure until the piece has passed from beneath it, where upon it will return by the force of gravity (the abutment means 23 being heavier than the partial counter balance 24).

For the movement of the arms 25, various means may be taken. These may be mechanical; but I prefer electrical or pneumatic means, and to this end I have shown upon either side of the body of my gauge and stop, pneumatic cylinders 31 equipped with pistons 32 and piston rods 32a, pivoted as at 33 to the ends of the arms 25 which are bifurcated as shown. An upward movement of the pistons 32 in the cylinders will thus have the effect of turning the arms 25 in a clockwise direction sufficiently to bring the stop abutment 23 out of the path of travel of a sheet or other metal piece upon the conveyor. The piston rods may be guided in arms 34 projecting from the sides of the lower body portion 8 of my mechanism. In place of the pneumatic or other fluid actuated cylinders shown (which are shown as attached to the upper body portion 11 of my device) I may employ solenoids, to the armatures or core members of which the rods 33 are attached, and thus operate my shear gauge by electric current instead of by fluid under pressure. It will be understood that suitable valves for the control of the pressure fluid or suitable contact devices for the control of an electric circuit may be mounted upon the shear mechanism to be actuated by a movement of the shear knife in proper timing sequence, so that my stop abutment may be moved from the path of travel of sheets after the end of the shearing stroke. In the embodiment shown in my drawings, fluid under pressure is admitted to the cylinders 31 through inlets 35 to which are attached any suitable conduits or connections. These connections will be flexible to permit the movement of my shear gauge along the rails 6. Controlling valves may be located where desired, whether upon the shear gauge and stop itself or elsewhere (as is preferable) and these valves may be hand actuated or mechanically or electrically actuated either under the direct control of an operator or, as hereinabove indicated, by automatic means in synchronism with the movements of the shear.

I provide in my mechanism also means for holding down the sheets or other metal pieces riding along the conveyor 5 so that these will not be lifted by the movement of the stop or abutment. Arms 36 are rotatably mounted upon the shaft 21 by means of bushing members 37. The forward extensions of these arms 36 as shown in Figure 2 are bifurcated and carry rollers 38 arranged to contact the upper edges of metal pieces and to hold these down as the abutment 23 is being lifted out of the way. The rollers 38 also serve the function of holding the metal pieces more perfectly in contact with the conveyor mechanism 5 and to this end are urged downwardly by mechanism next to be described. The rearward extensions of the arms 36 are engaged from beneath by hooked rods 39 which pass through extensions 40 of the frame of my device and are drawn upwardly by coiled springs 41 bearing against washer members 42 on the upper ends of the rods, held by nuts 43. These rods therefore tend to urge the arms 36 to rotate about the shaft 21 in a counter clockwise direction. To limit this rotation so as to bring the rollers 38 into the required position for the holding and feeding of metal pieces, a set screw 44 is threaded into the frame extension 40, is provided with a lock nut 45, and bears against the upper part of the rearward extension of arms 36, as clearly shown in Figure 2. By means of this set screw device, the lowermost position of the rollers 38 may be accurately gauged; but in accommodating thicker pieces or irregularities in the metal pieces on the conveyor, the arms 36 may rotate in a clockwise direction against the action of the springs 41. Where the metal pieces are likely to be irregular or warped, I may provide the forward ends of the arms 36 with curved extensions 46 adapted to guide the bent ends of pieces down into more perfect contact with the rollers 38.

Figure 4:
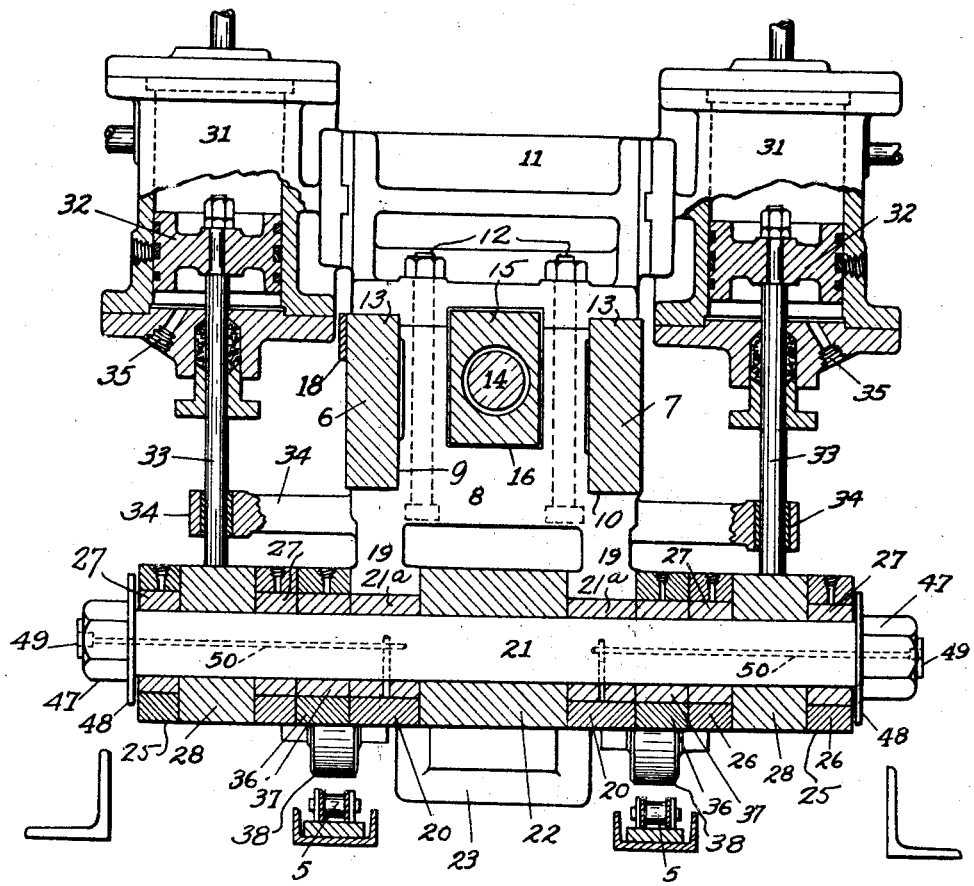
Figure 4 is a transverse sectional view along the line running centrally through the air cylinders.

The assembly of devices on the shaft 21 will now be clear from a consideration of Figure 4. At the center of the shaft, there is non-rotatably fixed the stop member 22. At either side of this, the shaft 21 is journalled in bearing members 19 which are a part of the frame. Again at either side, arms 36 having appropriate bushings are rotatably journalled on the shaft. Beyond these the interspaced portions of the yokes of actuating arms 25 are rotatably journalled by means of bushings upon the shaft. Within these yoke portions the pawl members 28 are non-rotatably fixed to the shaft 21; and to hold these several mechanisms in assembly, the ends of the shaft may be threaded to receive nuts 47 which hold washers 48 in place. Suitable fixtures 49 may be provided on the ends of the shaft 21 for a grease gun or the like, and lubricant passages 50 may extend from these fittings to bearing surfaces which it is desired to keep lubricated.

From the foregoing description, the nature of my invention will be clear. It will be obvious that changes and modifications may be made therein without departing from the spirit of my invention which having thus described, what I claim as new and desire to secure by Letters Patent is:

1. In a shear gauge and stop mechanism, a shaft, a movable abutment member non-rotatably fixed to said shaft and adapted by the rotation thereof to be moved into and out of the path of movement of pieces to be arrested, an actuating arm rotatably pivoted upon said shaft, pawl means non-rotatably affixed to said shaft and cooperating with said actuating arm whereby said actuating arm may positively effect the rotation of said shaft in one direction and means for moving said actuating arm.

2. In a shear gauge and stop mechanism, a shaft, a movable abutment member non-rotatably fixed to said shaft and adapted by the rotation thereof to be moved into and out of the path of movement of pieces to be arrested, an actuating arm rotatably pivoted upon said shaft, pawl means non-rotatably affixed to said shaft and cooperating with said actuating arm whereby said actuating arm may positively effect the rotation of said shaft in one direction and means for moving said actuating arm, said means comprising a fluid pressure cylinder.

3. In a gauge and stop mechanism, rails supported above a table, a body member slidable along said rails, means to move said body member along said rails, a shaft journalled in said body member, a movable abutment member non-rotatably fixed to said shaft and adapted by the rotation thereof to be moved into and out of the path of movement of pieces to be arrested, an actuating arm rotatably pivoted upon said shaft, pawl means non-rotatably affixed to said shaft and cooperating with said actuating arm whereby said actuating arm may positively effect rotation of said shaft in one direction and means for moving said actuating arm, said means comprising a fluid pressure cylinder attached to said body.

4. A gauge and stop mechanism comprising a body slidable along rails supported above a table, a shaft journalled in interspaced bearings in said body, stop means affixed to said shaft between said bearings, and comprising an arm bearing an abutment, said arm tending by its weight to cause rotation of said shaft in one direction, actuating arms for causing the rotation of said shaft in the opposite direction, said actuating arms journalled rotatably on said shaft, pawl means affixed to said shaft and cooperating with said actuating arms, pressure cylinders mounted on said body and having pistons and piston rods and connections between said piston rods and said actuating arms whereby upon movement of said pistons said shaft may be positively rotated in said opposite direction.

5. In a shear gauge and stop mechanism, a shaft, a movable abutment member non-rotatably fixed to said shaft and adapted by the rotation thereof to be moved into and out of the path of movement of pieces to be arrested, an actuating arm rotatably pivoted upon said shaft, pawl means non-rotatably affixed to said shaft and cooperating with said actuating arm whereby said actuating arm may positively effect the rotation of said shaft in one direction and means for moving said actuating arm, said means comprising a fluid pressure cylinder, a hold down arm rotatably pivoted on said shaft and bearing hold down means on its outer end, and means for yieldably retaining the said hold down arm in position.

6. In a gauge and stop mechanism, rails supported above a table, a body member slidable along said rails, means to move said body member along said rails, a shaft journalled in said body member, a movable abutment member non-rotatably fixed to said shaft and adapted by the rotation thereof to be moved into and out of the path of movement of pieces to be arrested, an actuating arm rotatably pivoted upon said shaft, pawl means non-rotatably affixed to said shaft and cooperating with said actuating arm whereby said actuating arm may positively affect the rotation of said shaft in one direction, and means for moving said actuating arm, said means comprising a fluid pressure cylinder attached to said body, hold down arms pivoted on said shaft, said arms bearing hold down means on their outer ends, and means for yieldably urging said arms into hold down position.

RUSSELL C. HUNTSBERGER.